United States Patent [19]
Zielinski et al.

[11] Patent Number: 5,557,099
[45] Date of Patent: Sep. 17, 1996

[54] SIGNAL DEVICE FOR TURBO-ENGINES USING AN OPTICAL PROBE WITH AN ELLIPTICAL SHAPED LIGHT BEAM

[75] Inventors: Michael Zielinski, Unterschleissheim; Gerhard Ziller, Dachau, both of Germany

[73] Assignee: MTU Motoren- Und Turbinen-Union Muenchen GmbH, Munich, Germany

[21] Appl. No.: 364,096

[22] Filed: Dec. 27, 1994

[30] Foreign Application Priority Data

Dec. 24, 1993 [DE] Germany ............. 43 44 650.7

[51] Int. Cl.⁶ .................................................. G01J 1/04
[52] U.S. Cl. ..................... 250/227.11; 250/559.14; 250/559.17; 73/660; 73/661
[58] Field of Search .................. 250/227.11, 227.24, 250/227.28, 227.29, 231.1, 559.16, 559.17, 559.14; 73/655, 660, 661

[56] References Cited

U.S. PATENT DOCUMENTS

| | | |
|---|---|---|
| 4,049,349 | 9/1977 | Wennerstrom . |
| 4,080,823 | 3/1978 | Stargardter ............................. 73/655 |
| 4,593,566 | 6/1986 | Ellis ......................................... 73/660 |
| 4,765,742 | 8/1988 | Davinson .............................. 356/373 |
| 5,201,227 | 4/1993 | Iinuma et al. . |
| 5,293,040 | 3/1994 | Watanabe et al. ................. 250/231.1 |
| 5,390,545 | 2/1995 | Doan ....................................... 73/650 |

FOREIGN PATENT DOCUMENTS

| | | |
|---|---|---|
| 1463050 | 9/1969 | Germany . |
| 3700777 | 7/1987 | Germany . |

*Primary Examiner*—Edward P. Westin
*Assistant Examiner*—Stephen Calogero
*Attorney, Agent, or Firm*—Evenson, McKeown, Edwards & Lenahan, P.L.L.C.

[57] ABSTRACT

A signal device for turbo-engines which, by way of moving blades arranged on a rotor, when passing through a defined circumferential position of the housing, generates signals which are precise with respect to time. The device includes a probe which has fiber optical waveguides for emitting and receiving light. An illuminating beam is emitted which is focussed in the direction of the rotor. The probe is arranged on the housing at a distance with respect to free end faces of the moving blades. The probe emits the illuminating beam with an elliptical cross-section, through which the moving blades travel, in such a manner that, on each corresponding free end face, an elliptical illumination spot is imaged whose large axis is aligned essentially in parallel to the delivery-side or suction-side edges of the free end faces. The signals are generated from the light reflected by the free end faces.

18 Claims, 4 Drawing Sheets

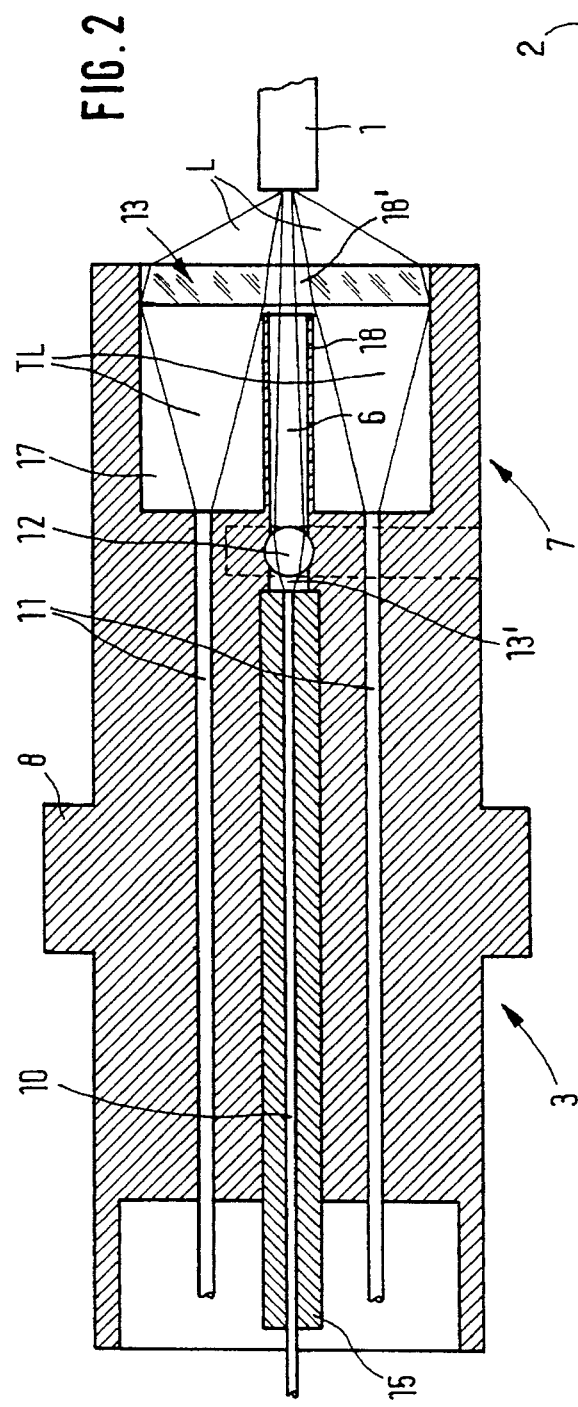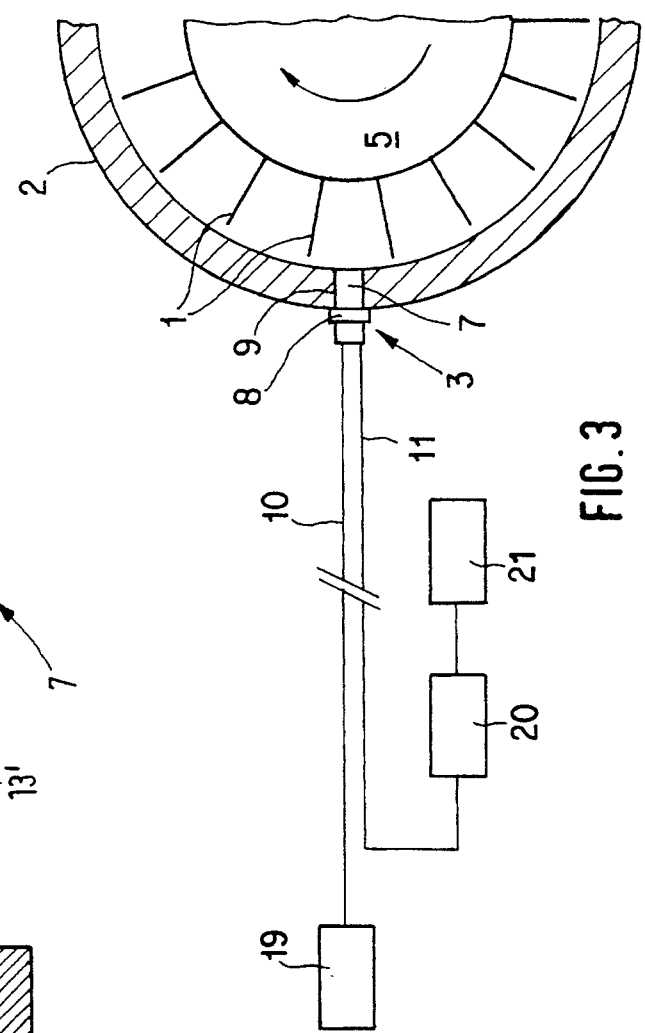

SIGNAL DEVICE FOR TURBO-ENGINES USING AN OPTICAL PROBE WITH AN ELLIPTICAL SHAPED LIGHT BEAM

BACKGROUND AND SUMMARY OF THE INVENTION

This invention relates to a signal device for turbo engines. For various special measurements on turbo-engines such as for measuring the blade vibrations, highly precise timed trigger pulses or position signals are required. The trigger pulses or position signals originate from the moving blades of the turbo-engines. The moving blades are operated at comparatively high rotational speeds. Optical probes are known to be used for this purpose. The blades travel through an illuminating beam which is correspondingly optically processed by the probe, in which case the trigger pulses are obtained from the light which is reflected by the blades on defined surfaces, for example, the blade face. The light is reflected partially in a diffuse and partially in a targeted manner. The signal rise or drop, which can be displayed by an optoelectronic receiver, is the result of the time which a defined section of the blade requires for passing through the illuminating beam.

Using a known conventionally constructed optical probe, which includes an imaging lens system, only a relatively small, virtually punctiform, illumination spot is generated on the defined blade surface in order to obtain steep signal flanks. Although characteristic signals with relatively steep flanks are already obtained from the received reflected light, it is a significant defect of the conventional probe that the imaged signals are very structured and, from one rotation of the rotor to the next, are characterized by a clearly different shape such that only trigger signals which have a poor time-related assignment to the blade position can be derived. Optical imaging using lenses in a receiving branch of the probe results in a comparatively small effective solid angle within the receiving cone of the reflected light. Furthermore, a considerable portion of the effective solid angle is reduced even further by being covered by lenses of the transmitting branch.

The punctiform, extremely small illumination spot leads to very changeable, non-reproducible reflection directions of the proportion of light which is reflected in a targeted manner. This is true particularly since, even by slight displacements of the illumination spot on the blade, different surface structures are passed through the illumination spot during each rotation. In order to achieve the required small illumination spot diameters, a coherent light source is used. However, as a result of interference, an intensity pattern (speckle pattern) is created in the reflected light which also depends on the surface structure of the blade and therefore varies with respect to place and time. For the above-mentioned reasons, for example, operationally caused radial and/or axial displacements of the rotor relative to the housing and, therefore, relative to the lighting beam result in pronounced changes of the signal shape.

German Patent document DE-OS 37 00 777 relates to an arrangement by which the rotating or moving condition of an object is measured in a highly precise manner. The arrangement consists of a reference position generator (1/rotation generator) and of a so-called "encoder" by which the position of the object is measured relative to the reference positions. The encoder operates using a diffraction grid which is firmly mounted on the object. The reference position generator operates according to the following principle. A rectangular reflection label mounted on the object is irradiated by a convergent luminous beam whose dimension in the area of the label is approximately twice as large as the label. Because of the convergence of the luminous beam, the reflected light, while the label passes through the luminous beam, travels through a defined angular area. Two correspondingly arranged photocells therefore see the reflected light in a time-staggered manner, and that label position is defined as the reference position at which both photocells indicate the same intensity.

In this known case, a cylinder lens is used, among others, in order to image an elongated scanning spot which is similar to the label on the reflection or reference label, in which case a longitudinal course of the reflection label is present which extends perpendicularly to the moving direction.

This operating principle requires that the reflection label be planar and reflect in a specular manner (the angle of incidence being equal to the angle of reflection). This requirement cannot be met, particularly for blade faces which have ground structures. In this case, the light would be scattered in a more or less diffuse manner and, as a result of the surface structure (scratches, striae), in directions that vary considerably from place to place. Polishing the faces would result in an additional cost-intensive operation. Also, it would have to be expected that, after the blades graze the inlet coatings of the housing during their operation (which frequently occurs, for example, in the case of compressor pumps), considerable grinding traces would again be present on the blade faces.

An arrangement known from German Patent document DE-AS 14 63 050 relates to photoelectric cutting line scanning analogous to the reflection and reference label scanning according to German Patent document DE-OS 37 00 77. In this case, the illuminating beam is expanded in one dimension in parallel to the cutting lines (fracture edges) of a glass band which are detected in order to stress the cutting lines on the moving glass band with respect to existing structures, such as dust or streaks in the glass. A cylinder lens is arranged in front of a linear luminous surface as the light source. A photocell is assigned to a fiber optical waveguide plate (fiber optical waveguide).

U.S. Pat. No. 5,201,227 relates to an arrangement for measuring the blade vibrations of rotating moving blades of a gas turbine engine. For this purpose, a probe is fixed to the turbine housing in such a manner that the radially interior probe end (face side) is arranged radially at a distance above the moving blade tips. The moving blade scanning takes place using an illuminating fiber optical waveguide which is arranged in the probe in an axially central manner and by using a receiving fiber optical waveguide which is arranged concentrically with respect to it. On the corresponding end of the probe head, the illuminating fiber optical waveguide includes a small diameter lens which is followed axially at a distance in the transmitting and receiving branch by a large diameter lens. A cover disk, which is situated on the probe face, has only a purely protective function. The arrangement results in a comparatively small receiving solid angle covered by the probe above the corresponding moving blade. The probe will therefore only be able to receive small proportions of the light reflected by the blade faces, in which case, in addition—as a cause of the given surface structures of the moving blade—only light reflections which "go randomly back and forth" and which furnish comparatively impure signals would be received.

Because of the construction of the above-described probe, the illumination spot on the blade is circular. This results in the following disadvantages. If the spot diameter were very small, because of the blade surface structure, very structured signals would be obtained which change from one rotation to the next and have the corresponding disadvantages with respect to the imprecision of the triggering. If the spot diameter were larger, an averaging could take place by way of the structures but, at the same time, the signal flanks would be flatter. This also has the disadvantages with respect to the triggering precision.

There is therefore needed a signal device for turbo-engines by which, particularly as the result of the construction and arrangement of an optical probe, while the turbo-engine is operating, signals can be generated by way of the moving blades. The signals should be optimally reproduced from one rotation of the rotor to the next and be largely uniform with a view to operational influences and definitions.

These needs are met according to the present invention by a signal device for turbo-engines which generates signals when moving blades on a rotor pass through a defined circumferential position of the housing. The signals are precise with respect to time. The signal device includes a probe which has fiber optical waveguides for emitting and receiving light and which emits an illuminating beam focussed in the direction of the rotor. The probe is arranged on the housing at a distance with respect to the free faces of the moving blades. The probe emits an illuminating beam with an elliptical cross-section, through which the moving blades travel, in such a manner that, on each corresponding blade face, an elliptical illumination spot is imaged whose large axis is aligned essentially in parallel to the delivery-side or suction-side edges of the faces. The signals are generated from the light reflected by the blade faces.

Through the use of the device according to the present invention, signals can be made available which, among others, have the following advantageous characteristics:

1) The signals are slightly structured; i.e., the signal shape is largely unimpaired by the surface structure of the moving blade faces given on the material side and possibly by the mechanical machining (grinding) or wearing-out (on the inlet coatings);

2) The signals can be reproduced from one rotation to the next;

3) The signals have steep signals flanks; and

4) The signals have slight intensity fluctuations in the case of a distance between the probe and the blade which can be varied in a relatively large defined area.

The device according to the present invention is preferably suitable for use on axial-flow compressors or turbines of turbo-engines, particularly gas turbine engines. In a radial bore of the compressor housing or turbine housing, the optical probe is fixed at the desired distance of preferably 0.5 to 2.5 mm from the blade faces. According to the invention, during each blade pass through the illuminating beam, an elliptical illumination spot is imaged on the respective blade face. Before it is fastened on the housing, the probe must only be rotated in the circumferential direction to such an extent that the large axis of the elliptical illuminating beam is aligned locally in parallel, for example, with respect to the delivery-side edge, on a blade face, and the small elliptical axis (smallest beam diameter) therefore extends transversely to the respective edge. In this case, it is a prerequisite that, during the construction of the probe, the illuminating beam be aligned with the course of the probe axis by way of the illuminating—particularly, monomode—fiber optical waveguide contained in the probe. The signal rise or the signal fall is therefore the result of the time required for the delivery-side or suction-side edge of the concerned blade face to pass through the elliptical illuminating beam.

The expansion of the illuminating beam in parallel to the respective blade edge leads to a considerable reduction of the influence of the surface structure of the blade on the received signal obtained from the reflected light. The endeavored rise rate of the signal in this case is not influenced in a disadvantageous manner. The indicated focussing of the illuminating beam transversely with respect to the respective edge results in short rise times of the probe signal.

The construction and the arrangement of the cover disk in the receiving part or branch of the probe allows for a large receiving solid angle. This is because light reflected by the blades can be received by a relatively large disk surface. As a result of the indicated edge-parallel expansion of the illuminating beam, an advantageous construction is possible (adjusting of the fiber optical waveguide for the probe illumination). In addition, an advantageous optical separation of the transmitting and the receiving portion or branch of the probe using the arrangement and construction of a tube-shaped screen within the recess which, in turn—despite the screen—can be uniformly illuminated for the most part by the received light.

Other objects, advantages and novel features of the present invention will become apparent from the following detailed description of the invention when considered in conjunction with the accompanying drawings.

BRIEF DESCRIPTION OF THE DRAWINGS

FIG. 2 is a longitudinal sectional center view of the optical probe in a face-side assignment to a blade section which is broken off on one side, in which a basic construction of the probe is illustrated;

FIG. 3 is a partial cross-sectional view of the turbo-engine housing with the assigned moving blades on the rotor and the assigned optical probe on the housing, the housing being coupled with a light source for generating the illuminating beam, with an optical receiver and with a trigger unit which are each illustrated schematically;

DETAILED DESCRIPTION OF THE DRAWINGS

Figure 1:
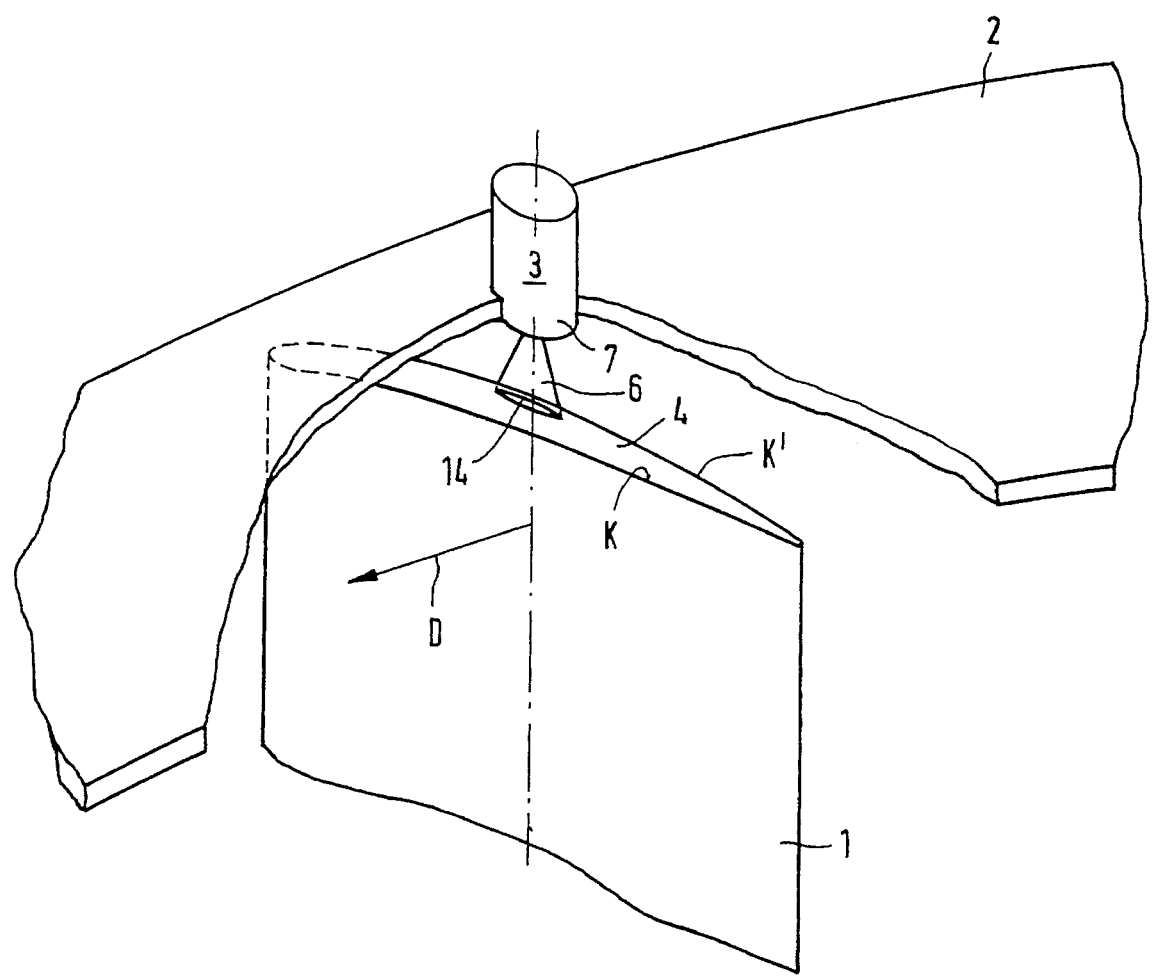
FIG. 1 is a schematic perspective representation of an optical probe on a housing section of a turbo-engine, the housing being shown partially broken away, the representation showing an assignment of a radially exterior face of a moving blade section with the illuminating beam of the probe with an imaging of an elliptical illumination spot on the face as well as indicating the relative rotating direction D of the blade or the rotor.
Figure 5:
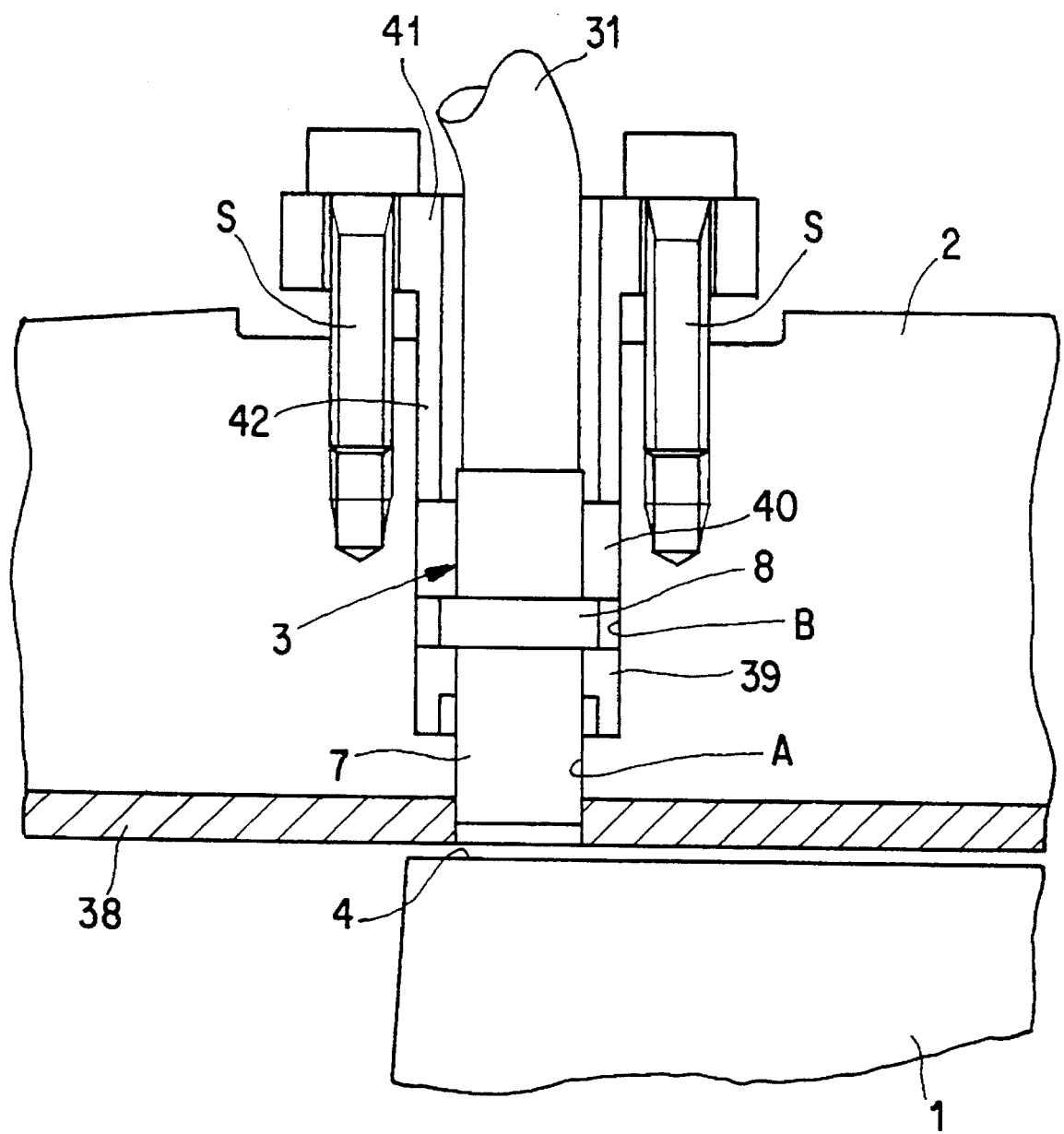
FIG. 5 is a view of a alternative fastening of the probe on the housing relative to a moving blade, in which case this embodiment is illustrated in a longitudinal sectional view of a housing portion, which is broken off on both sides, in conjunction with a blade portion which is also illustrated in a locally broken-off manner.

A signal device for turbo-engines is described and illustrated which, while the turbo-engine is operating, supplies signals precisely at those points in time at which the moving blades 1 travel through a defined circumferential position relative to the housing 2 of the turbo-engine. For this purpose, an optical probe 3 is used which, in the direction of the rotor 5 (FIG. 3), emits a focussed illuminating beam 6 (FIGS. 1 and 2) through which each moving blade 1 passes. The signals are obtained from the light reflected by the moving blades 1. As illustrated in FIGS. 1, 3 and 5, the probe 3 is fastened on the housing 2 radially at a distance above the faces 4 (FIG. 1) of the free moving blade ends by way of the face side on the head portion 7. FIGS. 1 and 3 are schematic representations illustrating the fastening and arrangement of the probe on the housing 4. As an example, FIG. 3 shows the fastening of the probe by way of a surrounding collar 8 arranged on the outside of the housing 2, the head portion 7 being disposed in a radial passage bore 9 of the housing 2. A preferred special fastening arrangement of the probe 3 on the housing 2 used in practice will be described in detail in the following in conjunction with FIG. 5.

Figure 4:
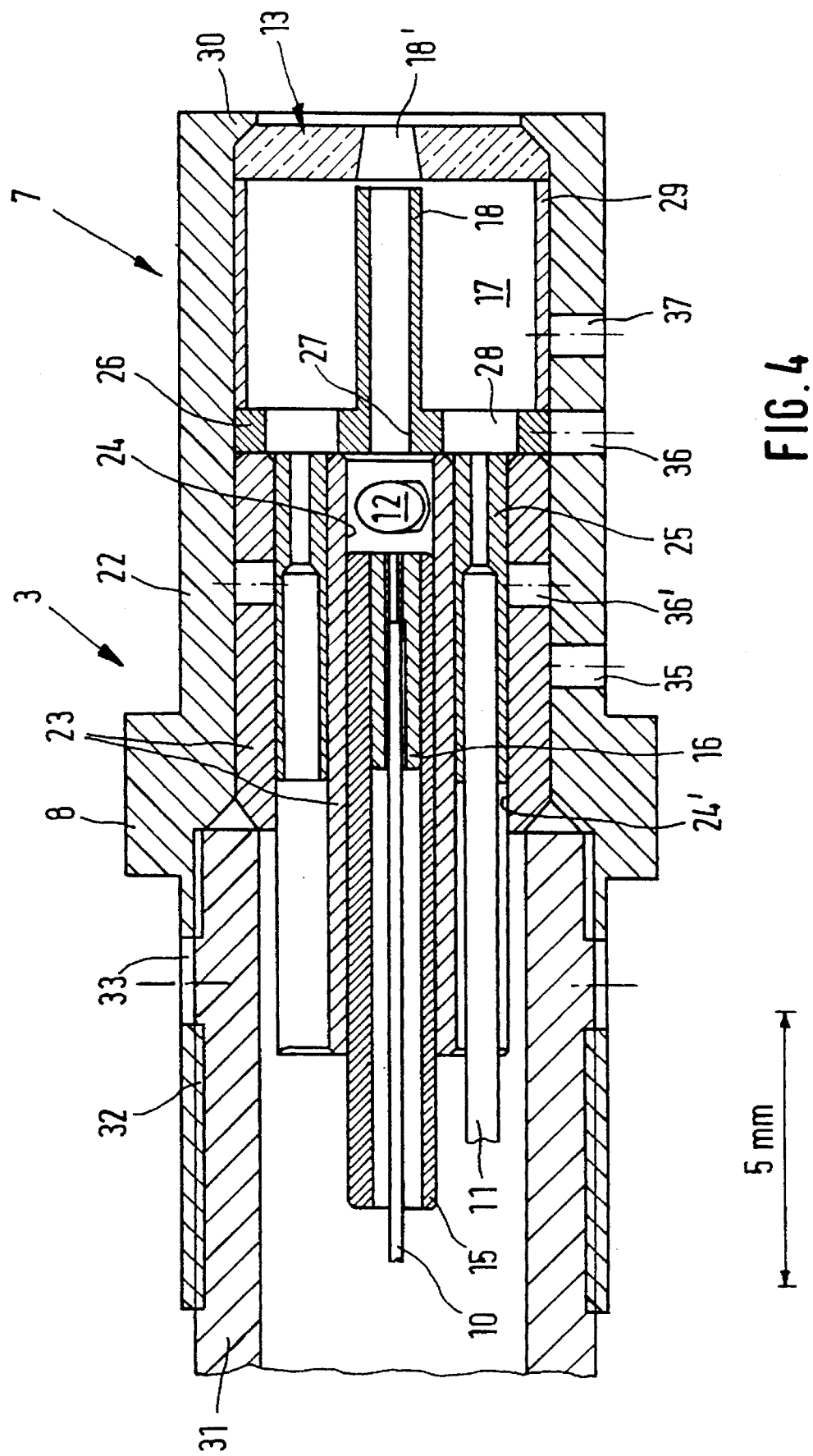
FIG. 4 is a detailed view of a construction of the optical probe according to FIG. 2, also represented as a longitudinal sectional center view.

According to FIGS. 2 and 4, the probe 3 has a transmitting fiber optical waveguide 10 for emitting light and several receiving fiber optical waveguides 11 for receiving light, a cylinder lens 12 and a partially scattering cover disk 13. The probe 3 is constructed and arranged on the housing 2 in such a manner that the lens 12 contained in it focusses a luminous beam 13', which emerges in a divergent manner from the central fiber optical waveguide 10, in a plane and, as a result, generates the illuminating beam 6. As illustrated in FIG. 1, an elliptical illumination spot 14 is imaged in this manner on the respective blade face 4, the large elliptical axis of the spot 14 being aligned essentially in parallel to one or both of the two delivery-side or suction-side edges K, K', and the smaller elliptical axis therefore extending transversely with respect to the course of the edge on the blade face 4. A portion TL (FIG. 2) of the light reflected in each case from the blade faces 4 into the solid angle range L, by way of the predominantly diffusely scattering cover disk 13, is coupled into the receiving fiber optical waveguides 11. These may be arranged to be uniformly distributed along the circumference as well as at a radial distance and in parallel to the probe axis.

In order to permit an alignment of the illuminating beam in parallel to the longitudinal axis of the probe when the transmitting fiber optical waveguide 10 is installed into an insert 23, as illustrated particularly in FIG. 4, the transmitting fiber optical waveguide 10 may extend eccentrically relative to the position of the lens 12 and the longitudinal axis of the probe in a sleeve 15 of the probe body. The sleeve 15 can be rotated in the circumferential direction and fixed. For this purpose, the sleeve 15 is drilled through eccentrically in the longitudinal direction, in which case an end section of the transmitting fiber optical waveguide 10 is fixed by an insertion piece 16 (FIG. 4) inside the eccentric longitudinal bore of the sleeve 15.

The cover disk 13 (FIG. 2) covers a housing recess 17, which is constructed at the head portion 7 of the probe 3 and is open on the face side of the probe. The cover disk 13 is constructed to be diffusely scattering outside a central optically polished disk section 18'. The illuminating beam 6 focussed by the lens 12 travels through the recess 17 inside a coaxial tube-shaped screen 18 which has a free end arranged a short axial distance in front of the central disk section 18' which the illuminating beam 6 traverses. The tube-shaped screen 18 prevents a cross-over between the transmitting and the receiving branch on the head portion 7 of the probe 3. The recess 17 can be illuminated essentially uniformly by the light reflected by the moving blades 1 and received by the diffusely scattering section of the cover disk 13 within the solid angle area L, in which case a portion of this light reaches the solid angle area TL and is coupled into the respective receiving fiber optical waveguides 11. The waveguides 11 are arranged to end on one side on the bottom of the recess 17.

A laser may be used as a light source 19 (FIG. 3). In this case, the light provided from the laser is coupled into the transmitting fiber optical waveguide 10 on the side facing away from the cylinder lens 12. Preferably, this transmitting fiber optical waveguide 10 may be constructed as a monomode fiber optical waveguide. The light, which is coupled on the end side of the probe 3 facing away from the head portion 7 into the receiving fiber optical waveguides 11 (FIG. 2) in a sequential manner can be transmitted to an optical receiver 20 (FIG. 3) and, by way of a trigger unit 21 coupled with the receiver 20, can be converted into the electric signal which corresponds to the defined circumferential position.

According to FIG. 4, the probe 3 has a cylindrical housing 22 with an insert 23 which can be fixed in the housing 22 in a coaxial manner. The insert 23 is provided with a central axial bore 24 for the sleeve 15. The sleeve 15 can be rotated in the circumferential direction. In addition, the insert 23 has bores 24' for sleeve-shaped insertion pieces 25, which bores 24' extend at a radial distance and in parallel to the sleeve 15. In these insertion pieces 25, the receiving fiber optical waveguides 11 (see also FIG. 2) are guided within the probe 3 and fastened.

The recess 17 contained on the head portion 7 of the probe 3 is formed by a section of the cylindrical housing 22 which projects axially over the insert 23. The portion of the recess 17 which can be illuminated is axially limited by means of the predominantly diffusely scattering cover disk 13 arranged on the face side and a disk 26 which is disposed on one end side of the insert 23 and which is at the same time the support for the tube-shaped screen 18 which extends axially through the recess 17. By way of a central disk bore 27, the tube-shaped screen 18 is connected with a section of the axial central bore 24 for the sleeve 15 in which the cylinder lens 12 is arranged. The disk 26 has openings 28 which are arranged so that they are coordinated with the local position of the respective ends of the receiving fiber optical waveguides 11.

As also illustrated in FIG. 4, the disk 26 with the tube-shaped screen 18 and the predominantly diffusely scattering cover disk 13 are held axially at a distance by a spacer ring 29 within the recess 17. In this case, the cover disk 13 is supported along a bevelled outer end face on a rotationally symmetrical projection 30 of the cylindrical housing 22 at the head portion 7 of the probe 3.

On the end side facing away from the head portion 7 of the probe 3, the cylindrical housing 22 is connected with a silicone-encased metal tube 31. After a local tong-type compression of the housing 22 provided in this area with an internal thread 32, the silicone casing forms a form-locking connection with this housing 22. Bores 33 prevent a spreading of the mechanical stresses occurring during the crimping operation into the forward area of the probe housing 7, 8. For the compression, a crimping tool may be used. The crimping tool has jaws adapted to the locally desired housing geometry of the probe.

The insert 23, the disk 26, and the spacer ring 29 may be glued to the cylindrical housing 22 of the probe 3. The cylindrical housing 22 includes radial passage bores 35, 36, 37 for the local feeding of the adhesive. The sleeve-shaped insertion pieces 25 for the receiving fiber optical waveguides 11 may also be glued to the insert 23 inside the corresponding bores 24', the insert 23 having radial passage bores 36' for the feeding of an adhesive.

With the construction according to FIG. 2 and/or FIG. 4, a probe 3 is provided which has relatively small dimensions. For example, the measure of length indicated in FIG. 4 corresponds to an actual measure of length of 5 mm. Also, according to FIG. 4, a compact, installation-friendly and vibration-resistant construction is obtained having relatively few components.

FIG. 5 illustrates an easy to handle, practical, holding and fastening embodiment for the probe.

In this case, from the direction of the exterior side of the housing 2, the probe 3 is inserted into a radial passage bore 9 which narrows down to a smaller diameter on the interior side of the housing 2. The smaller diameter portion A of the bore passes through an inlet coating 38 for the moving blades 1. The inlet coating 38 extends axially and along the circumference of the housing 2 on the interior side. Inside the significantly longer axial portion B of the passage bore having the large diameter, the probe 3 is disposed using a collar 8 on a spacer ring 39 which axially reaches partially around the probe 3 on the outer circumference. On the side facing away from the spacer ring 39, the probe 3 is axially supported by the collar 8 on a holding ring 40 in section B of the passage bore. The holding ring 40 is interrupted by an axial recess matching the size of the diameter of the silicone-encased metal tube 31. The securement of the probe takes place by a fastening flange 41 which is screwed (S) to the housing 2 from the outside and which is disposed by a cylindrical section 42 in section B of the passage bore with an axial contact pressure on the holding ring 40. Having its face side on the probe head 7, the probe 3 projects into the inlet coating 38. Even in the case of extreme radial gap changes of the moving blades 1 or changes of the radial distances between the blade faces 4 and the probe face side—possibly connected with grazing operations of the blades 1 on the inlet coating 38—optimal signals can be achieved.

Particularly good results of the probe 3 according to the invention are achieved by the following optical characteristics:

Operating Distance: 0.5 to 2.5 mm between the probe face side and the blade faces 4

Beam Diameter:
1) Approximately 50 μm (transversely to the respective blade edge K or K')
2) approximately 1 mm (in parallel to the respective blade edge K or K')

Change of the Signal Amplitude: <±20%

Background Signal (Distance>30 mm): Amplitude<2% of the maximal amplitude.

The probe 3 therefore furnishes slightly structured, stable signals with steep flanks, with a high image definition and a negligible signal background of the blade footings.

The probe is mechanically dimensioned so as to have a diameter of 8 mm and a length of 22 mm in a preferred embodiment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A signal device for use with a turbo-engine having moving blades with free end faces on a rotor which pass through a defined circumferential position relative to a housing, said signal device generating timing signals at exact points in time at which said moving blades pass through said defined circumferential position, the device comprising:

a probe having a head end with a recess formed therein, said head end fixing the probe on the housing radially at a distance with respect to said free end faces, said probe including an axially central transmitting fiber optic waveguide and axially receiving fiber optic waveguides arranged separately and spaced apart from said axially central transmitting fiber optic waveguide so as to end on one side at a bottom of said recess;

wherein the probe further comprises a cylinder lens which is optically connected in front of the axially central transmitting fiber optic waveguide, and a substantially diffusely scattering cover disk including a central optically polished disk section, said substantially diffusely scattering cover disk covering said recess constructed on the head end of said probe;

wherein the cylinder lens focusses a luminous beam from said transmitting fiber optic waveguide into an illuminating beam having an elliptical cross-section, said illuminating beam passing through said recess and said central optically polished disk section such that an elliptical spot is imaged onto each passing free end face of said moving blades, said elliptical spot having its large axis aligned substantially parallel to one of a delivery side and suction side edge of the free end faces;

wherein the probe further comprises a coaxially tube-shaped screen arranged in said recess, the illuminating beam focussed by the cylinder lens passing through said recess within said coaxially tube-shaped screen;

wherein a portion of the illuminating beam reflected off said free end faces is coupled through said diffusely scattering cover disk and the recess into the receiving fiber optic waveguides;

an optical receiver which receives the reflected light coupled in sequences into the receiving fiber optic waveguides; and a trigger unit coupled to said optical receiver for converting the reflected light sequences into electrical signals.

2. A device according to claim 1, wherein said substantially diffusely scattering cover disk is formed of a diffusely scattering disk section surrounding said central optically polished disk section; and wherein said cylinder lens focuses said luminous beam which emerges from said transmitting fiber optic waveguide in a divergent manner.

3. A device according to claim 2, further comprising a sleeve formed in a body of the probe, said sleeve being rotated in a circumferential direction and being fixable in said body, wherein the transmitting fiber optic waveguide extends eccentrically in the sleeve relative to a position of the cylinder lens and a longitudinal axis of the probe.

4. A device according to claim 2, wherein said recess is open on a face side of the probe; and wherein, via the emitted light reflected by the free end faces and received by the cover disk within a solid angle range, said recess is illuminated substantially uniformly, a portion of the reflected light falling into an additional solid angle area which is coupled into the receiving fiber optic waveguides.

5. A device according to claim 4, wherein said coaxially tube-shaped screen is arranged in said recess so as to have a free end positioned at a narrow distance in front of the central polished disk section.

6. A device according to claim 2, further comprising a laser as a light source, said laser acting upon an end of the transmitting fiber optic waveguide facing away from the cylinder lens.

7. A device according to claim 1,
wherein the reflected light coupled in sequences into the receiving fiber optic waveguides is transmitted on an end side of the probe facing away from the head end to the optical receiver which is coupled with the trigger unit, said electrical signals generated by the trigger unit corresponding to the defined circumferential position.

8. A device according to claim 6, wherein the transmitting fiber optic waveguide is a monomode fiber optic waveguide.

9. A device according to claim 7, wherein the transmitting fiber optic waveguide is a monomode fiber optic waveguide.

10. A device according to claim 3, wherein the probe further includes:
a cylindrical housing and an insert which is coaxially fixed in the cylindrical housing, said insert being equipped with a central axial bore for the sleeve which can be rotated in the circumferential direction and said insert having outer bores, which extend at a radial distance and in parallel with respect to the sleeve; and
sleeve-shaped insertion pieces which are received in said outer bores, said sleeve-shaped insertion pieces guiding and fastening the receiving fiber optic waveguides arranged therein within the probe.

11. A device according to claim 10, wherein said recess situated on a head end of the probe is provided by a section of the cylindrical housing which axially projects over the insert, the portion of the recess which is illuminated being axially bounded by the diffusely scattering cover disk arranged on the face side and by a further disk which is disposed on an end side of the insert and which, at the same time, provides the support for the tube-shaped screen which extends axially through the recess and which is connected by way of a central disk bore with a section of the axial central bore for the sleeve in which the cylinder lens is arranged, the further disk having openings which are arranged to be adapted to a local position of the receiving fiber optic waveguide ends, and wherein the further disk, with the tube-shaped screen and the cover disk, is held by a spacer ring within the recess at a distance in an axial manner, the cover disk being supported along a bevelled exterior end face on a rotationally symmetrical projection of the cylindrical housing on the head end of the probe.

12. A device according to claim 11, wherein the cylindrical housing is connected on an end side facing away from the head end of the probe with a silicone-encased metal tube in which the silicone casing, after a local exterior tong-type compression of the housing provided in this area with an internal thread, forms a form-locking connection with the thread, bores of the housing arranged in the connecting area preventing a spreading of mechanical stresses occurring during a crimping operation into a forward housing area of the probe.

13. A device according to claim 11, wherein the insert, the disk, and the spacer ring are glued to the cylindrical housing of the probe, the cylindrical housing having passage bores for a local feeding of the adhesive.

14. A device according to claim 12, wherein the insert, the disk, and the spacer ring are glued to the cylindrical housing of the probe, the cylindrical housing having passage bores for a local feeding of the adhesive.

15. A device according to claim 10, wherein the sleeve-shaped insertion pieces for the receiving fiber optic waveguides inside the corresponding bores are glued to the insert which has passage bores for the feeding of an adhesive.

16. A device according to claim 11, wherein the sleeve-shaped insertion pieces for the receiving fiber optic waveguides inside the corresponding bores are glued to the insert which has passage bores for the feeding of an adhesive.

17. A device according to claim 12, wherein the sleeve-shaped insertion pieces for the receiving fiber optic waveguides inside the corresponding bores are glued to the insert which has passage bores for the feeding of an adhesive.

18. A device according to claim 13, wherein the sleeve-shaped insertion pieces for the receiving fiber optic waveguides inside the corresponding bores are glued to the insert which has passage bores for the feeding of an adhesive.

* * * * *